United States Patent [19]

Shukunami et al.

[11] Patent Number: 5,031,116
[45] Date of Patent: Jul. 9, 1991

[54] IMAGE FORMING APPARATUS

[75] Inventors: Hiroshi Shukunami, Yokohama; Yasufumi Tanimoto, Fujisawa; Satoshi Onuma, Kawasaki, all of Japan

[73] Assignee: Kabushiki Kaisha Toshiba, Kawasaki, Japan

[21] Appl. No.: 426,045

[22] Filed: Oct. 24, 1989

[30] Foreign Application Priority Data

Oct. 25, 1988 [JP] Japan .................. 63-268868
Oct. 31, 1988 [JP] Japan .................. 63-275640
Oct. 31, 1988 [JP] Japan .................. 63-275641

[51] Int. Cl.$^5$ ............................................ G06K 15/00
[52] U.S. Cl. ................................. 364/519; 355/311

[58] Field of Search ................... 364/518-520; 355/311, 55; 271/9; 358/296, 449, 467, 462; 346/154

[56] References Cited

U.S. PATENT DOCUMENTS 4,417,282 11/1983 Yamamoto ................... 358/296
4,647,188 3/1987 Komiya et al. ................ 355/55

Primary Examiner—Arthur G. Evans
Attorney, Agent, or Firm—Foley & lardner

[57] ABSTRACT

An image forming apparatus as provided which receives image data supplied from a host unit and forms an image on an image forming medium. Even if a desired image forming medium is not present, the received image data is edited to allow a desired image to be formed on an arbitrary image forming medium as a substitute for the desired image forming medium.

7 Claims, 11 Drawing Sheets

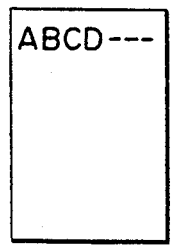  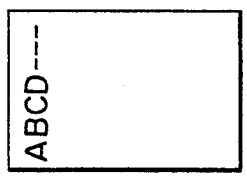 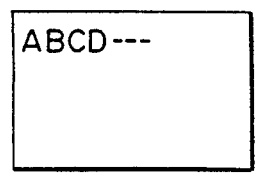
FIG. 7A  FIG. 7B  FIG. 7C  FIG. 7D
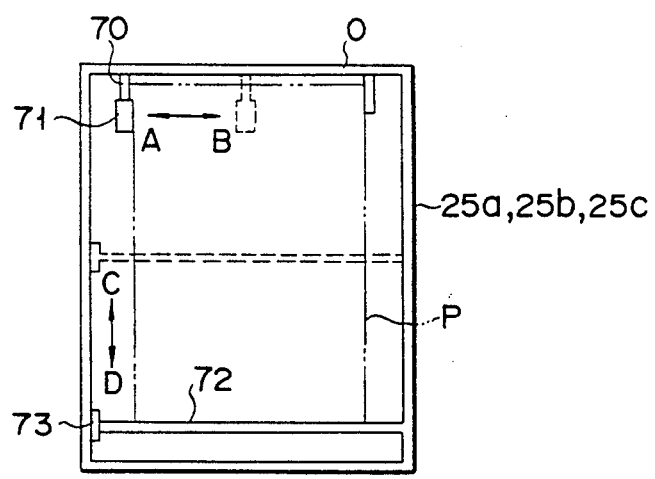
FIG. 4

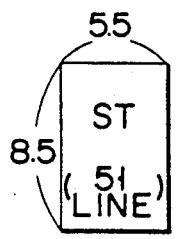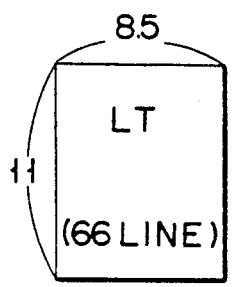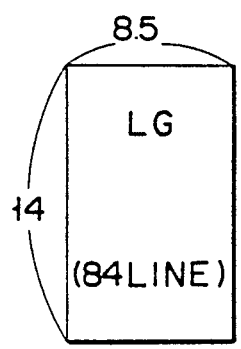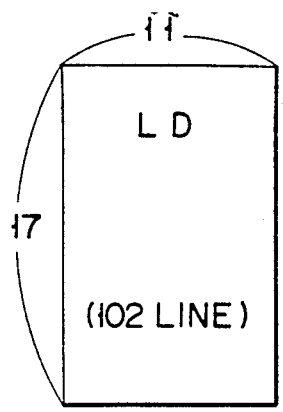
FIG. 9A    FIG. 9B    FIG. 9C    FIG. 9D
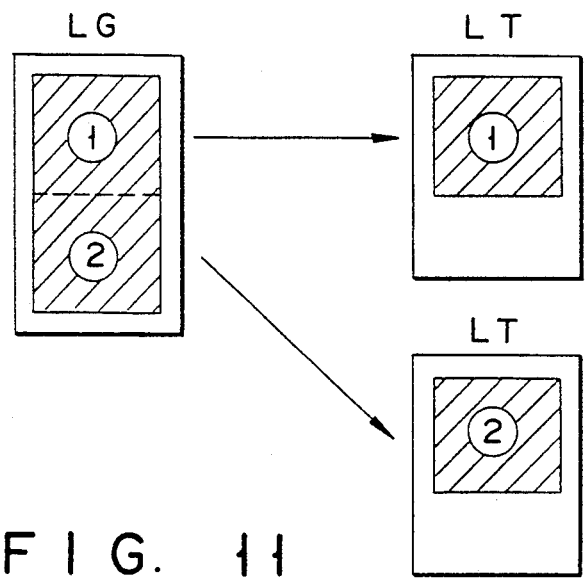
FIG. 11
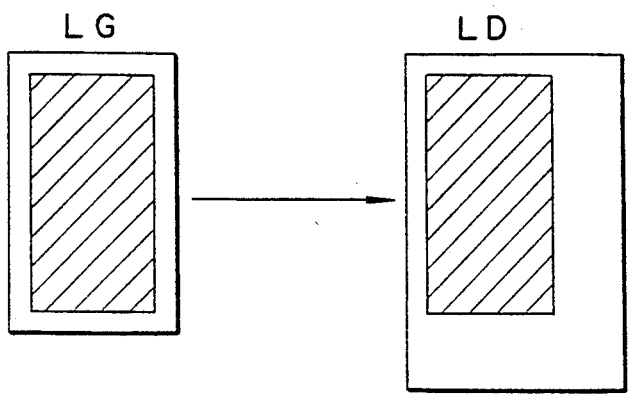
FIG. 12

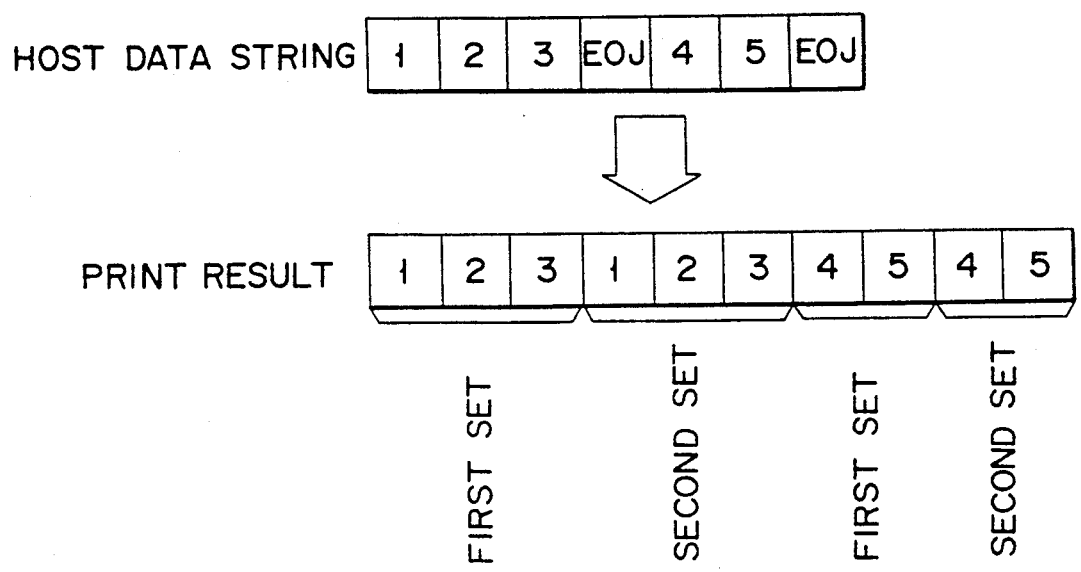
F I G. 14

IMAGE FORMING APPARATUS

BACKGROUND OF THE INVENTION

1. Field of the Invention

The present invention relates to an improvement in an image forming apparatus, such as a laser printer or an electronic copying machine, for forming an image in accordance with image data transmitted from, e.g., a host unit.

2. Description of the Related Art

A conventional image forming apparatus, such as a laser printer, an electronic copying machine, or the like is typically connected to a host unit, such as a computer, an image reader unit, or the like. This apparatus forms an image on an image forming medium, e.g., a sheet of paper in accordance with image data transmitted from this host unit.

In such an image forming apparatus, a strong demand has arisen for an improvement in operation of the apparatus by reducing labor improvement for paper replenishment, increasing speed of image formation, improving edit functions, etc. In conventional image forming apparatuses, however, many problems currently exist. For example, the maximum printable width of paper (although envelopes, gummed labels, and the like are used as an image forming medium in addition to paper, all theseforms will hereinafter by referred to as paper) is limited by the width of the photosensitive drum in the apparatus. Therefore, sheets of paper having a plurality of sizes which are limited by the maximum width of the drum are respectively set in corresponding paper feed cassettes, and paper of a predetermined size is selected in accordance with an application purpose. In this case, the size of a paper cassette is set to allow paper of the maximum size to be stored therein. Paper of a smaller size is set in this cassette by positioning a corner of the paper at an arbitrary origin of the cassette.

In setting of paper, paper of the same size is set by aligning a long side of the paper with the paper feed direction, or by aligning a short side of the paper with the paper feed direction. When the paper which is set in this manner is to be printed, portrait or landscape printing is performed. In portrait printing, printing is performed on a line extending in a direction perpendicular to the paper feed direction. In landscape printing, printing is performed on a line extending parallel to the paper feed direction. Designation of a direction of printing on paper, which includes both the printing schemes described above, is called orientation.

Data to be printed on paper may be lost depending on a manner of setting paper and a designation of orientation. For example, assume that paper is set by aligning its short side with the paper feed direction and that landscape printing is carelessly designated by an operator in spite of the fact that portrait printing should be designated. In such a case, the operator must reset the paper by aligning its long side with the paper feed direction and must resume the printing operation. If this occurs, paper will be wasted, and moreover a cumbersome and time consuming operation is required to resume printing, resulting in a less effective operation.

Some conventional image forming apparatuses employ two paper feed cassettes to store paper of the same size. In one cassette, paper is set by the manner of aligning its long side with the paper feed direction. In the other cassette, paper is set by the manner of aligning its short side with the paper feed direction. However, when a particular paper feed cassette is selected having a desired paper feed direction, and the paper feed cassette becomes empty during printing, the printing operation is stopped while a display on the apparatus signifies that the cassette is empty. Therefore, the maximum number of sheets of paper on which images can be continuously formed is limited by the capacity of one paper feed cassette. If a large quantity of image forming is required, paper replenishment must be frequently performed, thereby resulting in lower efficiency.

The manner of aligning a short side of paper with the paper feed direction allows a larger number of images to be formed on paper per unit time compared to the other manner of paper setting. This is because the number of sheets of paper to be fed per unit time can be increased when the paper is set by aligning a short side of paper with the paper feed direction where the paper feed speed is constant.

In such a conventional apparatus, however, once an operator sets paper by aligning its long side with the paper feed direction, the paper feed operation cannot be switched to feeding sheets of paper set with their short sides aligned with the paper feed direction without stopping the paper feed operation. As a result, it often takes a long time to form images, thus making a high-speed printing operation impossible.

Further, such conventional image forming apparatuses are quite expensive. In addition, if the apparatus is connected only to a single host unit, its operation efficiency becomes undesirably low because of the limited access. For this reason, a multiport arrangement for allowing access of a plurality of host units is widely employed. Image forming apparatuses, which employ such a multiport arrangement accessed by a plurality of host units, are designed to form images of various sizes. Therefore, these apparatuses generally have paper feed cassettes which store sheets of paper of various sizes in order to allow formation of the images of various sizes described above.

In order to respond to image forming requests from these host units, the image forming apparatus receives data associated with the size of paper, i.e., data for designating a form length, as a command from a given host unit prior to reception of image data, and analyzes the command to check whether paper is present in a corresponding paper feed cassette. If no paper is present, a signal is generated that the cassette is empty to alert the operator to replenish the paper.

If the operator is present near the image forming apparatus, this will present no problem. However, if the operator is not present near the apparatus, i.e., an unmanned operation is performed, paper replenishment is not performed. This may create a number of problems. For example, a receiving buffer, which is arranged in the image forming apparatus to store temporarily image data, is filled with data, and hence either cannot respond to an image forming request with respect to paper of another size from another host unit or else it will lose received image data. Further, if a given host unit is requested to stop transmitting image data, processing on the host unit side will be delayed.

When a plurality of sets of sheets are to be printed by the above-described image forming apparatus, a designated number of sheets are first printed with respect to one-page image data supplied from a host unit, and a designated number of sheets are then printed with respect to the next one-page image data. Similarly, a designated number of sheets are printed for each page. The printed sheets, which are obtained by printing the designated numbers of sheets for all the pages in this manner, are not sorted. Therefore, the operator must sort the printed sheets in the order of pages in units of sets upon completion of printing of all the sheets, resulting in reduce efficiency.

SUMMARY OF THE INVENTION

It is an object of the present invention to provide an image forming apparatus which has edit functions by which the problems of the above-described conventional image forming apparatus can be solved.

A further object of the invention is to provide an image forming apparatus which is more efficient to use. The foregoing and additional objects are attained by providing an image forming apparatus comprising image data receiving means for receiving image data supplied from a host unit, image forming means for forming an image on an image forming medium in accordance with the image data received by the image data receiving means, and image data editing means interposed between the image data receiving means and the image forming means and having a function of editing the image data so as to allow a desired image to be formed on an arbitrary image forming medium even if desired image forming medium runs out.

With the above-described arrangement, the image forming apparatus of the present invention can reduce the amount of time spent in replenishing image forming media, increase the speed of image forming processing, and improve edit functions, among others.

BRIEF DESCRIPTION OF THE DRAWINGS

FIG. 4 is a plan view showing an arrangement of a paper feed cassette in FIG. 3;

FIGS. 7A to 7D are views each showing a paper setting direction with respect to the paper feed direction and corresponding orientation;

FIGS. 9A to 9D are views showing paper of different sizes used in the laser printer of the present invention;

FIG. 11 is a view showing a case wherein when paper of a desired size is not present, image data is divided to select paper of another size in accordance with the flow chart shown in FIG. 10;

FIG. 12 is a view showing a case wherein when paper of a desired size is not present, paper of another size is selected in accordance with the flow chart shown in FIG. 10;

FIG. 14 is a view showing a printing state obtained by a collate printing operation based on the flow chart shown in FIG. 13.

DETAILED DESCRIPTION OF THE PREFERRED EMBODIMENTS

Figure 1:
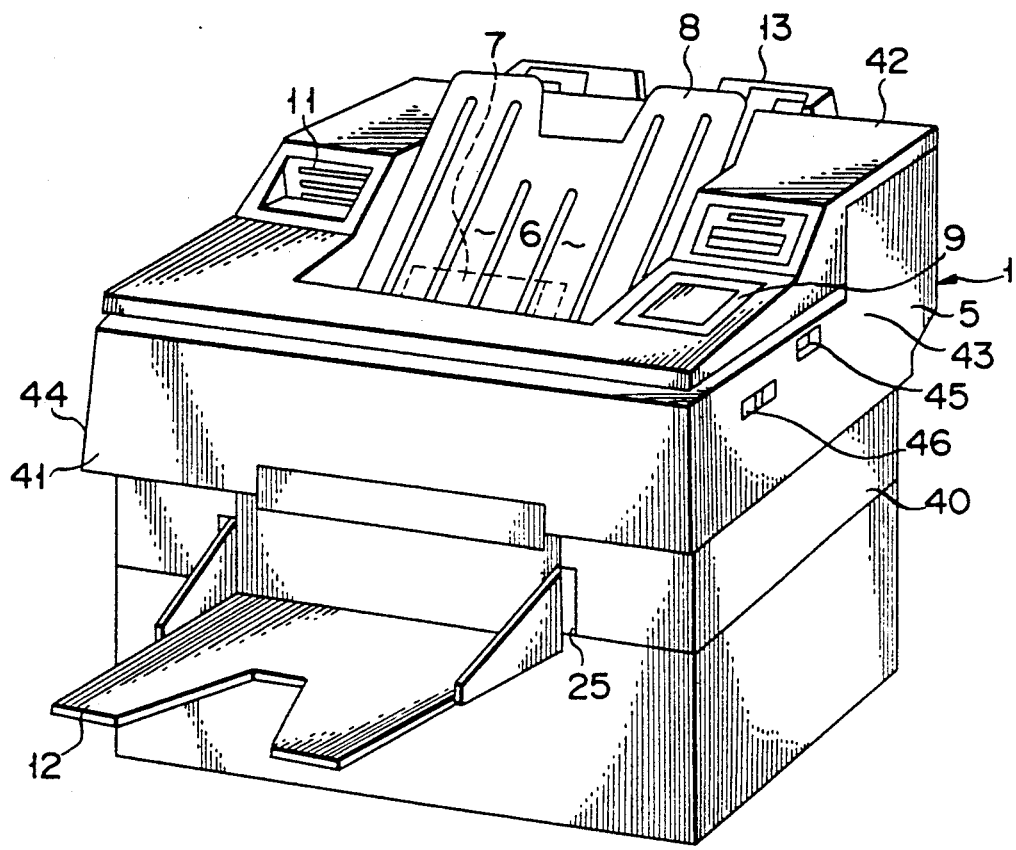
FIG. 1 is a perspective view showing an outer appearance of a laser printer as an image forming apparatus according to the present invention.

Referring to FIG. 1, reference numeral 5 denotes a printer main body of an image forming apparatus. A rear portion of the upper surface of the main body 5 is raised by one step. A recess 6 is formed in a central portion on the upper surface of the main body 5. A discharge tray 8, which is movably supported by a jogger 7, is mounted in the recess 6. An operation panel 9 and three IC card insertion ports 11 are arranged on the right and left sides, respectively, of the recess 6.

Figure 2:
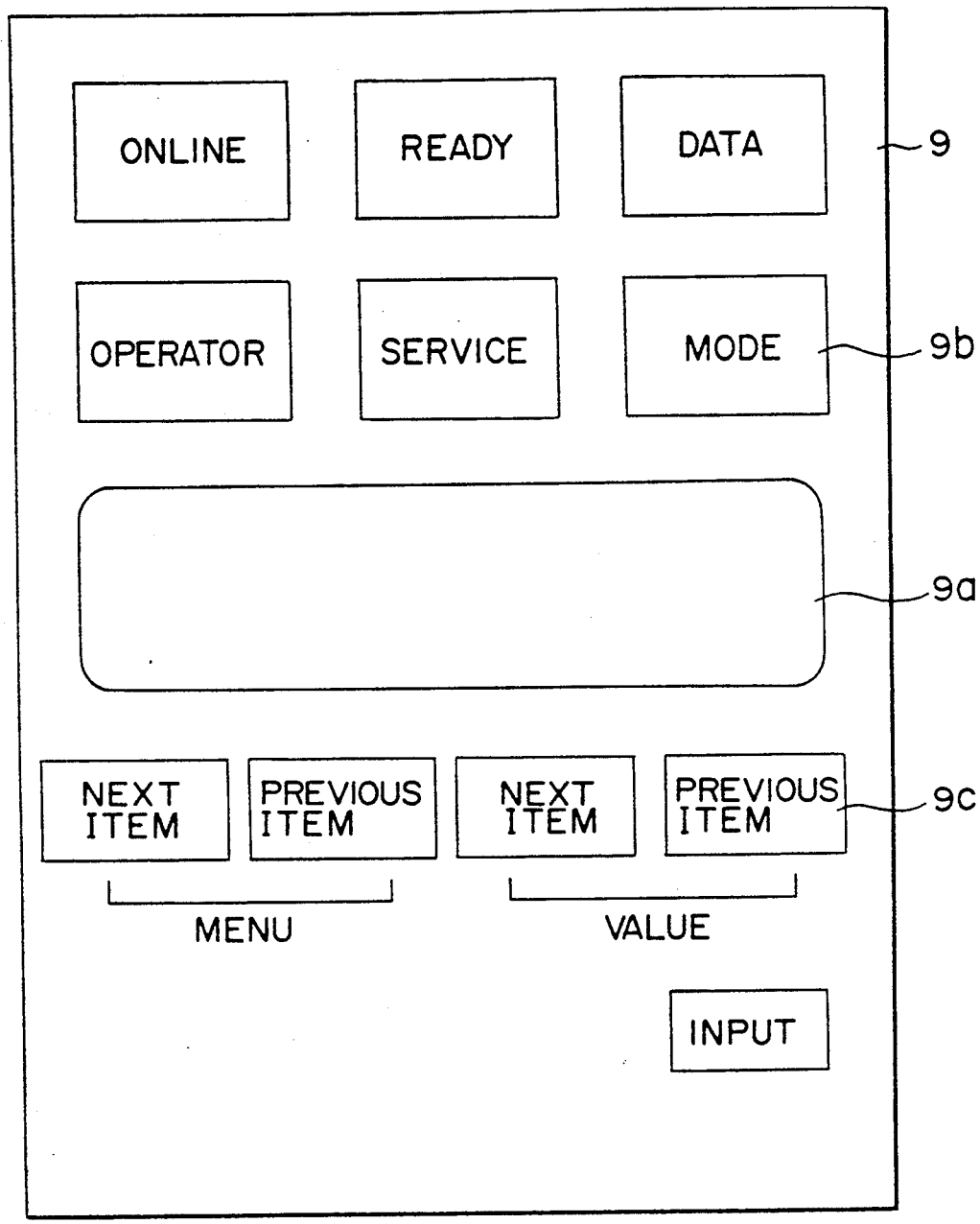
FIG. 2 is a front view showing an arrangement of operation keys of an operation panel in the laser printer in FIG. 1.

As shown in FIG. 2, the operation panel 9 comprises an LCD (liquid crystal) display 9a for displaying the number of sheets to be printed, a mode, a guidance/message, and the like, an LED display 9b for displaying various states upon illumination of LEDs (light-emitting diodes), and a switches 9c for designating various operations. The LED display 9b includes an "ON-LINE" display for indicating whether the printer is connected to an external unit, i.e., an online/offline mode; a "READY" display for indicating that the printer is in an operative state; a "DATA" display for indicating that image data is being transmitted; an "OPERATOR" display for requesting an operator call; a "SERVICE" for requesting a serviceman call; and a "MODE" display for indicating an automatic/manual operation.

The switches 9c include, for example menu keys, value keys, an input key, a ten-key pad (not shown), and the like. The menu keys consist of "NEXT ITEM" and "PREVIOUS ITEM" keys. A plurality of menu data to be displayed on the left half of the LCD display 9a are incremented every time the "NEXT ITEM" key is depressed, and decremented every time the "PREVIOUS ITEM" key is depressed. These display operations are cyclically repeated. The value keys consist of "NEXT ITEM" and "PREVIOUS ITEM" keys. A plurality of value data corresponding to menu data to be displayed on the right half of the LCD display 9a are incremented every time the "NEXT ITEM" key is depressed, and decremented every time the "PREVIOUS ITEM" key is depressed. These display operations are cyclically repeated. An operator selects a desired operation by operating the menu keys and the value keys, and designates a predetermined operation by depressing the input key. In addition, the value data can be input by using the ten-key pad. Hence, the ten-key pad is used to set the number of copies and the like.

Figure 3:
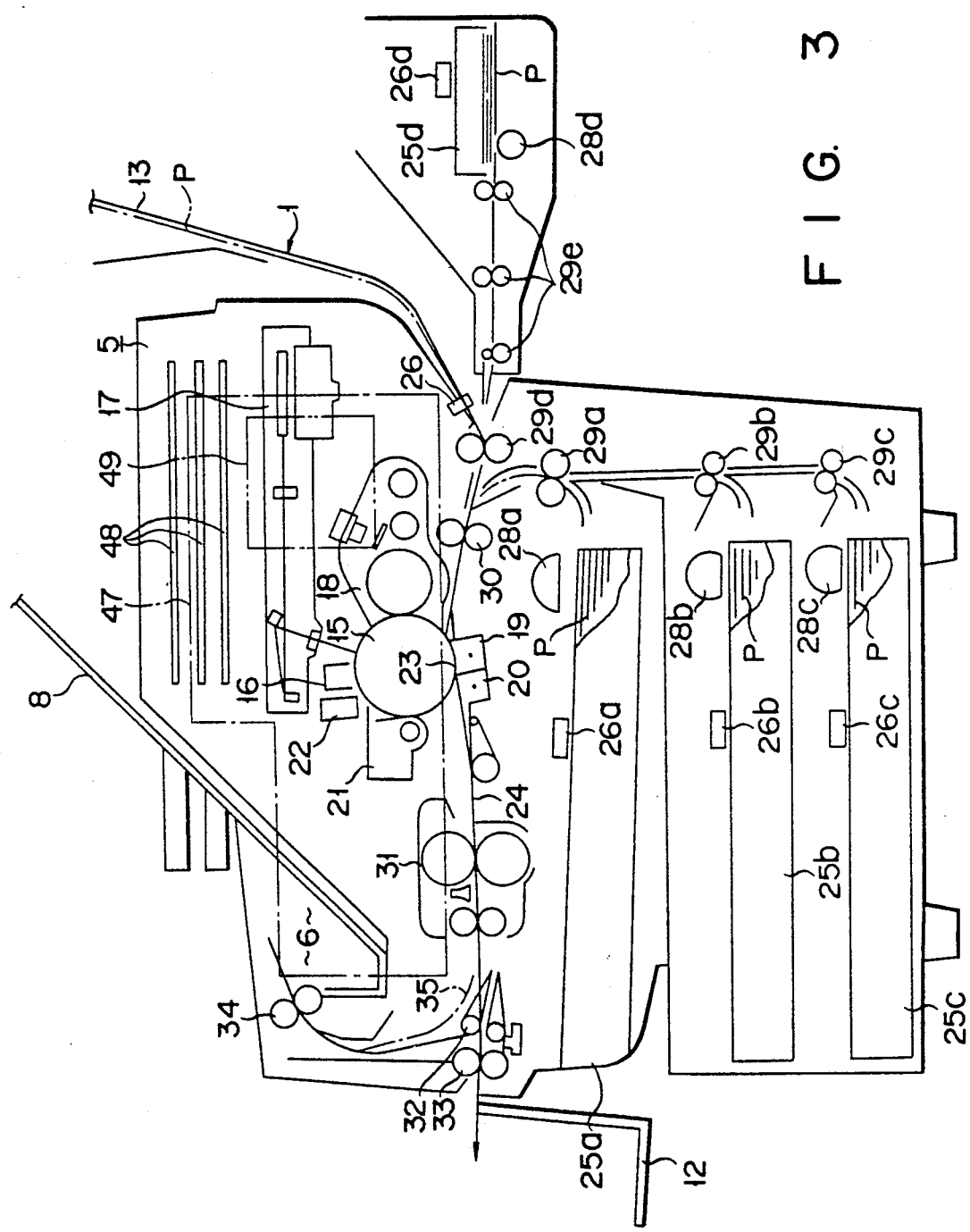
FIG. 3 is a longitudinal sectional side view showing a schematic internal arrangement of the laser printer in FIG. 1.

Referring now to FIG. 3, a discharge tray 12 and a manual insertion tray 13 are respectively arranged in the front and rear surfaces of the printer main body 5. A paper detector 26 is arranged at the bottom of the manual insertion tray 13 so as to detect that paper P as an image forming medium is inserted in the tray 13 and provide signal to a CPU 50 (FIG. 5) which will be described later.

As shown in FIG. 3, a drum-like photosensitive body 15 as an image carrier is arranged at substantially the center of the main body 5. A charger 16, a laser optical system 17, a developing unit 18, a transfer unit 19, a separating unit 20, a cleaner 21, and a discharge unit 22 are sequentially arranged around the photosensitive body 15.

An image support convey path 24 extends forward through an image transfer portion 23 defined between the photosensitive body 15 and the transfer unit 19. The convey path 24 guides the paper P to the image transfer portion 23. The paper P is automatically fed from one of paper feed cassettes 25a, 25b, and 25c housed in the bottom portion of the main body 5 through a corresponding pickup roller 28a, 28b, and 28c and corresponding feed roller pairs 29a, 29b, and 29c. The paper may also be manually fed from the insertion tray 13 through a feed roller pair 29d or automatically fed from a paper feed cassette 25d arranged at a rear portion of the image forming apparatus 1 through a pickup roller 28d and feed roller pairs 29e and 29d.

The paper feed cassettes 25a, 25b, and 25c are, for example, arranged as shown in FIG. 4. More specifically, the paper P is stored in the box-like paper feed cassettes 25a, 25b, and 25c upon positioning of the paper at an origin O. While the paper P is stored in this manner, levers 70 and 72 are moved in directions indicated by arrows A and B, and arrows C and D, respectively, in order to urge the paper P. In addition, press members 71 and 73 are respectively fixed to the distal ends of the levers 70 and 72 so that when the levers 70 and 72 are moved and set at peripheral positions, a plurality of position detecting switches 80, which are arranged in accordance with slide positions of the press members 71 and 73, are thereby urged. Detection signals from these position detecting switches 80 are supplied to the CPU 50 to be described later. As a result, the CPU 50 can obtain the current positions of the levers 71 and 72. The size and direction of the set paper P can be recognized from the position data of the levers 70 and 72.

Paper sensors (first, second, and third detecting means) 26a, 26b, and 26c and a paper sensor 26d are respectively, arranged above the paper feed cassettes 25a, 25b, 25c, and 25d so as to detect the present or absence of the paper P by detecting the presence or absence of reflected light. When the paper P is not present in each cassette, a corresponding sensor signals this to the CPU 50.

Referring again to FIG. 3, an aligning roller pair 30 is arranged on the upstream side of the image transfer portion 23 along the convey path 24; and a fixing unit 31, a paper discharge selector 32, and a discharge roller pair 33 are arranged on the downstream side of the convey path 24. A branch convey path 35 including a discharge roller pair 34 is formed at the terminal end side of the image support convey path 24 so as to guide the paper P selected by the selector 32 to the recess 6 as a paper discharge portion.

Referring once again to FIG. 1, reference numeral 40 denotes a lower cover; 41, a front cover; 42, an upper cover; 43, a right cover which can be opened and closed; 44, a left cover; 45, a right cover opening/closing lever; and 46, an upper unit opening/closing lever. Referring to FIG. 3, reference numerals 47 and 49 denote boards for mounting printer circuits for controlling an operation of the printer itself; and 48, a board on which a printer control circuit for controlling operations of the circuits 47 and 49 is mounted to form a printer control section. Three connectors (not shown) are attached to an end portion of each of the boards constituting the printer control section 48 so as to form IC card insertion ports 11, thereby allowing IC cards 65, 66, and 67 to be inserted therein.

When an image is to be formed, the photosensitive body 15 is rotated, and at the same time is uniformly charged by the charger 16. Exposure is then performed by the laser optical system 17 in accordance with an image signal to form an electrostatic latent image on the photosensitive body 15. The electrostatic latent image on the photosensitive body 15 is developed by the developing unit 18 using a two-component developing agent consisting of a toner and a carrier, and is supplied to the image transfer portion 23 side as a toner image.

In synchronism with the formation of this toner image, the paper P picked up from one of the paper feed cassettes 25a, 25b, or 25d, which is designated by the operation panel 9, or manually inserted is fed to the image transfer portion 23 through the aligning roller pair 30. As a result, the toner image formed on the photosensitive body 15 is transferred onto the paper P by the transfer unit 19. The paper P is then separated from the photosensitive body 15 by the separating unit 20, and is fed to the fixing unit 31 through the convey path 24. After the toner image is fused/fixed on the paper P, the discharge direction of the paper P is selected by the selector 32 to be discharged to the discharge tray 8 arranged at the upper portion or the discharge tray 12 arranged at the front portion.

After the toner image is transferred onto the paper P, the residual toner on the photosensitive body 15 is cleaned, and the body 15 is set to be ready for the next copying operation.

Figure 5:
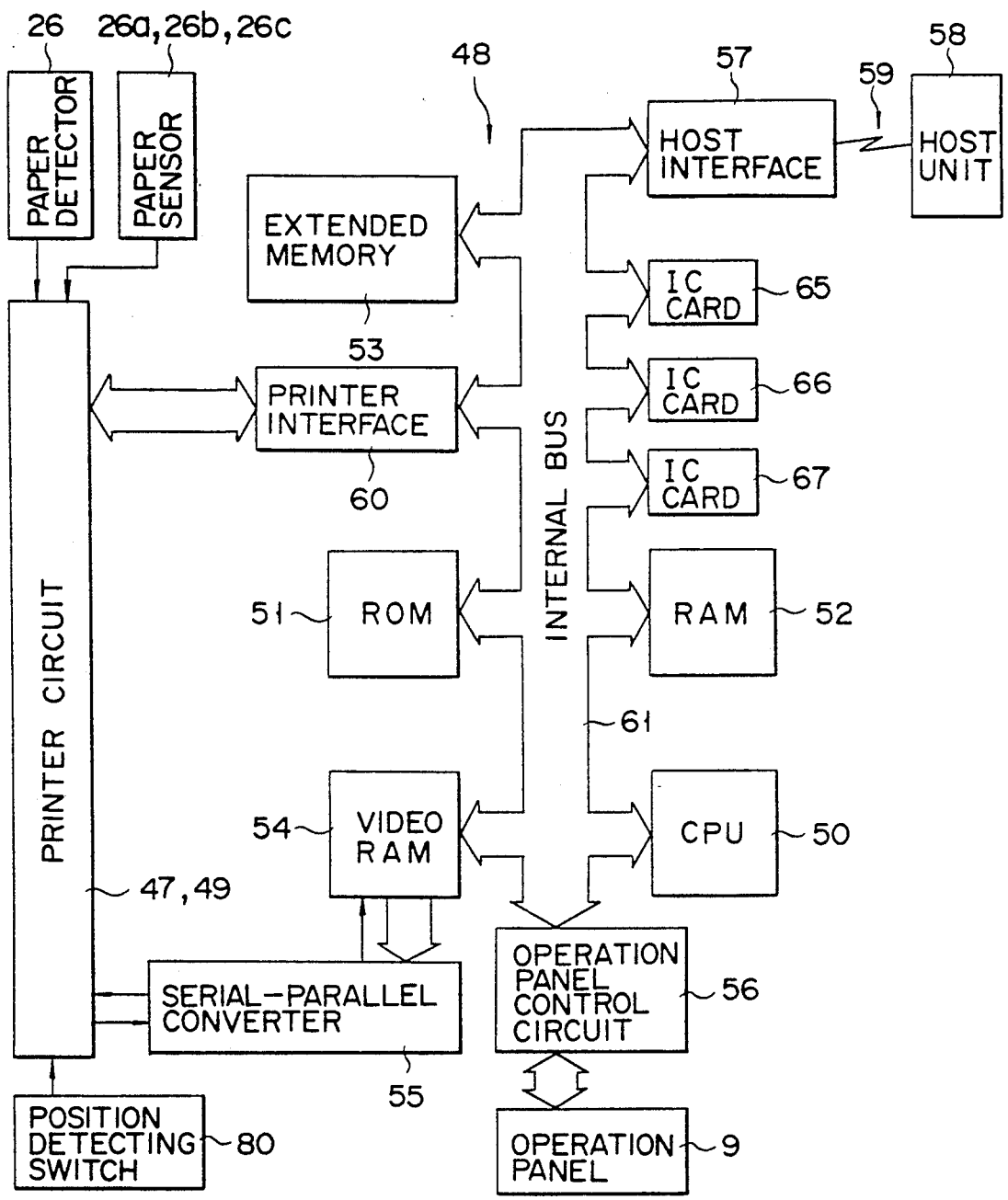
FIG. 5 is a block diagram showing a main part of an electric control circuit of a laser printer according to an embodiment of the present invention.

FIG. 5 shows a main part of the electric circuit of the printer control section 48 in FIG. 3. Referring to FIG. 5, the CPU (an image rotating means, a determining means, and an editing means) 50 controls the overall image forming apparatus 1. A ROM 51 stores control programs. The CPU 50 operates in accordance with these programs. In addition, the ROM 51 stores identification numbers (ID numbers) to be collated upon updating of data and data associated with the paper P, such as top and left margins and types of paper. A RAM (storage means) 52 is used as a page buffer for temporarily storing image data supplied from a host unit 58, or as a working buffer of the CPU 50.

An extended memory 53 is a large-capacity memory which is used when image data supplied from the host unit 58 is a large amount of data such as bit map data, and the RAM 52 cannot store one-page data thereof. A video RAM 54 is used as a scan buffer for storing image data which is developed into a bit image. An output from the RAM 54 is supplied to a serial-parallel converter 55. The converter 55 converts the image data, which is developed into a bit image and supplied as parallel data from the video RAM 54, into serial data, and outputs it to the printer circuits 47 and 49.

A host interface 57 serves to perform data transfer between the host unit 58, e.g., a computer or image read unit, and the printer control section 48. A transfer line 59 for connecting the interface 57 and the host unit 58 comprises two types of lines, i.e., serial and parallel lines. These lines can be selectively used in accordance with a type of data to be transferred between the host unit 58 and the interface 57. In addition, the host interface 57 includes a plurality of input/output ports (not shown) to be capable of connecting a plurality of host units 58. With this arrangement, the image forming apparatus 1 may be time-divisionally accessed by the plurality of host units 58 so as to form images of various sizes.

A printer interface 60 interfaces to the printer control section 48 and the printer circuits 47 and 49 through control signal lines. Detection signals from the paper feed sensor 26a, 26b, or 26c, or the position detecting switches 80 are supplied to the CPU 50 through this printer interface 60.

An operation panel control circuit 56 controls the operation panel 9 so as to cause the LCD display 9a to display a guidance message, to turn on/off the LED display 9b, to the LED display 9b cause to blink, or to supply data, which is input through the switch 9c, to the CPU 50. An internal bus 61 serves to perform data transfer among the CPU 50, the ROM 51, the RAM 52, the extended memory 53, the video RAM 54, the operation panel control circuit 56, the host interface 57, the printer interface 60, and the IC cards 65 to 67.

The IC cards 65 to 67 consist of nonvolatile memories, such as static RAMs, E$^2$PROMs, EPROMs with backup batteries, or mask ROMs. These IC cards 65 to 67 are used as extended memories or load media for programs or other data. These IC cards are preferably classified by colors in accordance with the types of memories and the functions of the stored contents. For example, an IC card of a mask ROM type in which a font is recorded is colored blue, and an IC card of a static RAM type in which emulation is recorded is colored orange. Therefore, the types of memories and written data of the IC cards 65 to 67 can be identified by their appearance.

Figure 6:
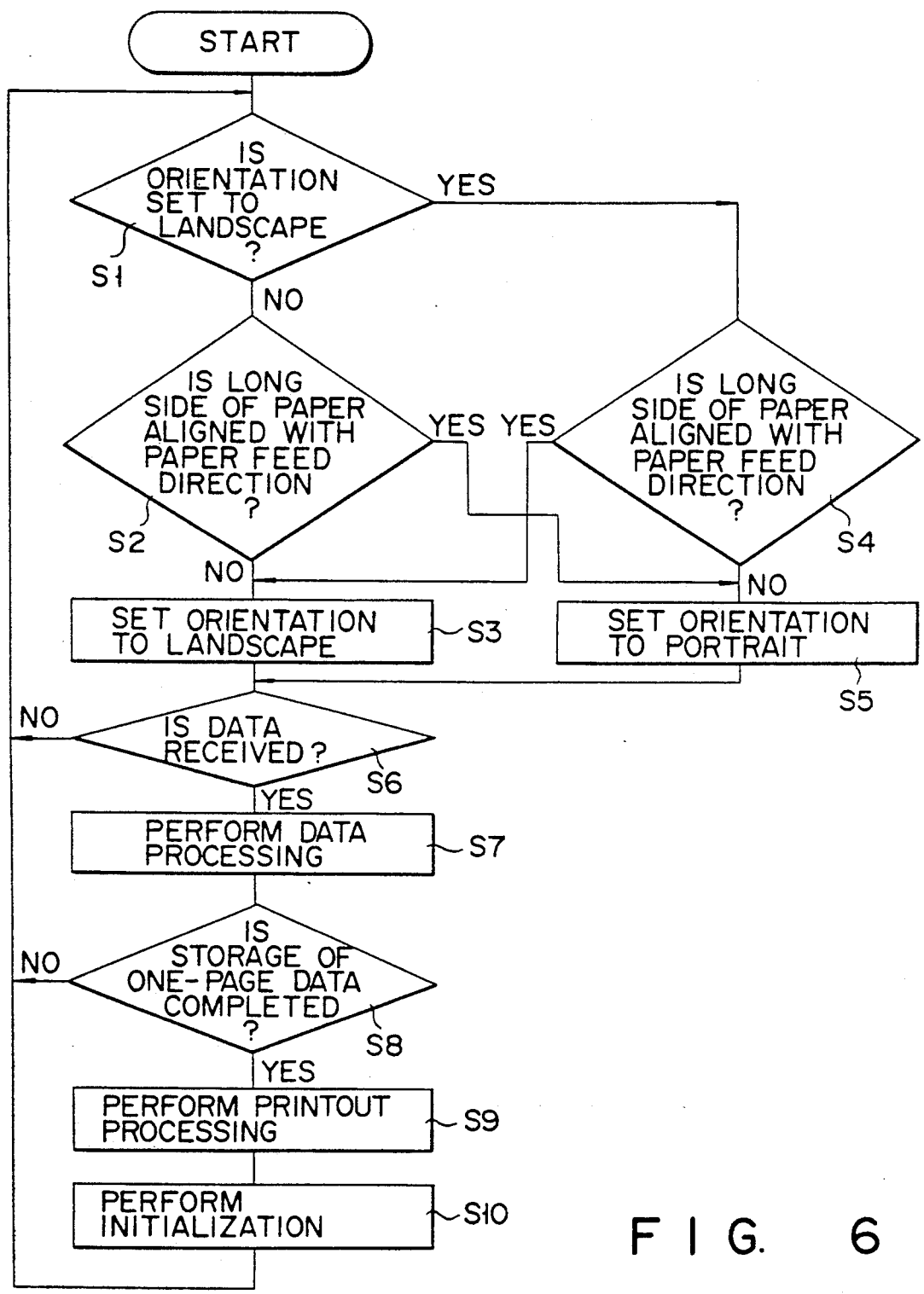
FIG. 6 is a flow chart for explaining an operation of automatic switching of orientation which is one of of the edit functions for image data in the laser printer of the present invention.

The operation of forming an image in accordance with the orientation designated by the operation panel 9 regardless of the set direction of the paper P with respect to the feed direction, will be described below with reference to a flow chart shown in FIG. 6.

An operator designates an orientation through the operation panel 9. This designating operation is performed as follows. The display contents in the message display area formed on the left portion of the LCD display 9a are cyclically changed by operating "NEXT ITEM" or "PREVIOUS ITEM" key of the operation panel 9 so as to display a message "ORIENT: " for setting orientation. In this state, the "NEXT ITEM" or "PREVIOUS ITEM" key for the value data is operated to cause the LCD display 9a to display "PORTRAIT" for performing portrait printing or "LANDSCAPE" for performing landscape printing on the right portion of the LCD display 9a. When the desired value data is displayed, the input key is depressed. With this input operation, one of the above-described value data is supplied to the CPU 50 through the operation panel control circuit 56, and is decoded by the CPU 50 and stored in the RAM 52 as a landscape or portrait flag.

When printing is started in this state, the above orientation flag is checked to determine whether the orientation is landscape (step S1).

When the orientation is determined to be a portrait designation such as is shown in FIG. 7A or 7D, the flow advances to step S2 to check whether a long side of the paper is aligned with the paper feed direction. The determination of the set direction of the paper is performed by analyzing signals from the position detecting switches 80 by using the CPU 50. If it is determined in step S2 that a short side of the paper is aligned with the paper feed direction to set the direction of the paper, the flow advances to step S3. As a result, the orientation is set to be landscape as shown in FIG. 7C, and data representing rotation of received character data is stored by setting internal flag (not shown) in the RAM 52 to be ON.

If YES is obtained in step S2 as shown in FIG. 7A, the flow advances to step S5 to keep the orientation as the portrait designation. As a result, data representing direct printing of the received characters is stored by setting the internal flag in the RAM 52 to be OFF.

If it is determined in step S1 that the orientation is a landscape designation as shown in FIG. 7B or 7C, the flow advances to step S4 to check whether a long side of the paper is aligned with the paper feed direction. If YES is obtained in step S4 as shown in FIG. 7B, the flow branches to step S3 to set the orientation to be a landscape designation. As a result, data representing rotation of the received character data is stored by setting the internal flag in the RAM 52 to be ON.

If NO is obtained in step S4, the flow advances to step S5 to set the orientation to be portrait as shown in FIG. 7D. As a result, data representing direct printing of the received characters is stored by setting the internal flag in RAM 52 to be OFF.

It is then checked whether data is received (step S6). If NO in step S6, the flow returns to step S1 to wait for data reception while executing the series of steps described above. If data is received in this state, the flow advances to step S7 to rotate the characters received in accordance with the internal flag stored in the RAM 52 or to store sequentially the characters in the RAM 52 without rotating them. If it is determined that one-page data is stored (step S8), image data stored in the page buffer is converted into bit image data to be supplied to the video RAM 54 serving as a scan buffer. The video RAM 54 supplies the bit image data as parallel data to the serial-parallel converter 55. The serial-parallel converter 55 converts the bit image data as the parallel data into serial data, and supplies it to the printer circuits 47 and 49. With this operation, an image is formed on the paper P which is fed to the image transfer portion 23 synchronously with the supply of the bit image data, thus completing the series of printout processing (step S9). The various flags and the like set in the above-described processing are initialized (step S10), and the flow returns to step S1 to repeat the same operation as described above with respect to the next image data. With the above-described operation, a plurality of sheets of paper are printed.

As described above, when image data supplied from the host unit 58 is to be printed, if orientation designated by the operation panel 9 coincides with the feed direction of the paper P detected by the position detecting switches 80, image formation is directly performed. If they do not coincide with each other, printing is performed upon rotation of the image data. Therefore, the operator can start printing without consideration of the set direction of the paper P, thus improving the operability.

Figure 8:
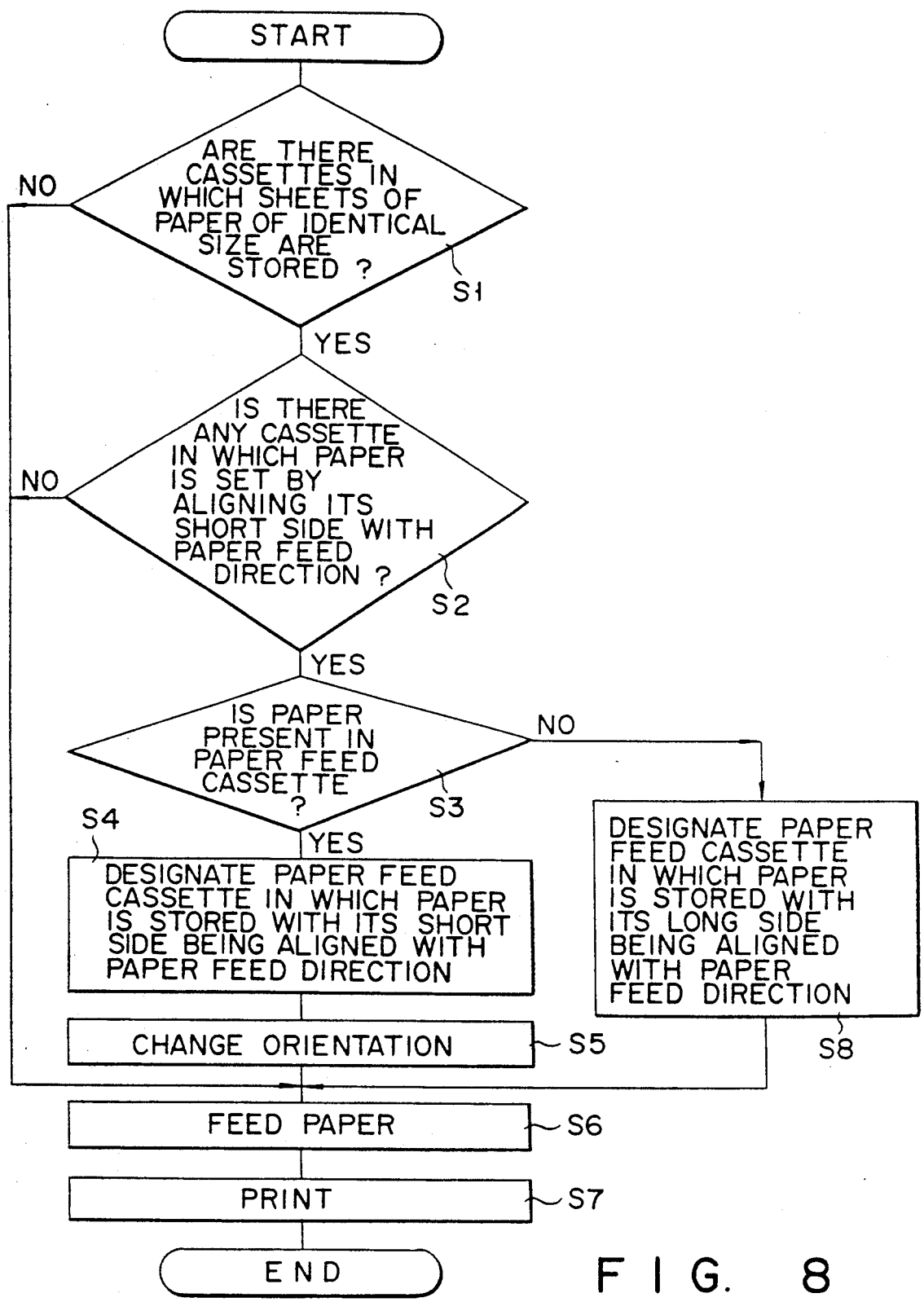
FIG. 8 is a flow chart for explaining an operation of another edit function in the laser printer of the present invention.

Another embodiment of the image forming apparatus having the above-described arrangement of the present invention will be described below with reference to FIG. 8. In this embodiment, sheets of paper having the same size are respectively stored in one paper feed cassette by aligning their long sides with the paper feed direction and in the other cassette by aligning their short sizes with the paper feed direction, so that when one paper feed cassette becomes empty, the sheets of paper stored in the other paper feed cassette are automatically selected. As a result, the maximum number of sheets of paper on which images can be formed can be substantially increased, and the number of replenishing operations of paper is decreased, thus increasing the efficiency of the apparatus. In addition, since priority is given to the paper of one set direction and is automatically selected, high-speed image formation can be realized.

Assume that portrait printing representing the printing direction of an image forming apparatus 1 is set as a default value, and that image data for portrait printing is supplied as image data from the host unit 58.

An operator designates the size of paper P through the operation panel 9. This designation is performed by selecting one of paper feed cassettes 25a, 25b, 25c, and 25d. This operation is performed as follows. A "NEXT ITEM" or "PREVIOUS ITEM" key for the menu data of the operation panel 9 is operated to change cyclically the display contents in the message display area formed on the left portion of an LCD display 9a to display a message "PAPER: " for designating a paper size. In this state, the "NEXT ITEM" or "PREVIOUS ITEM" key for the value data is cyclically operated to display "MAIN", "UPPER", or "LOWER" representing one of the paper feed cassettes in which the paper P of a desired size is stored, or "MANUAL" representing manual insertion in the value display area formed on the right portion of the LCD display 9a. When the desired value data is displayed, the input key is depressed. With this operation, the selected value data is supplied to a CPU 50 through an operation panel control circuit 56 to be decoded by the CPU 50, and is stored in a designated paper feed cassette area formed in a RAM 52 as data representing a paper feed cassette to be used.

When printing is started in this state, the size of the paper P stored in the paper feed cassette corresponding to the data stored in the designated paper feed cassette area formed in the RAM 52 is checked. Determination of this paper size is performed by analyzing detection signals from position detecting switches 80 by using the CPU 50. That is, the paper size is determined in accordance with the positions of levers 70 and 72 of the paper feed cassettes 25a, 25b, 25c, and 25d. At this time, therefore, it is not apparent whether the paper P is actually stored in the cassette 25a, 25b, 25c, or 25d.

It is then checked whether any other paper feed cassette is present which is set to be the same paper size as that of the designated cassette (step S1). This determination is also performed by analyzing detection signals from the position detecting switches 80 using the CPU 50. Hence, it is not apparent whether the paper P is actually stored. In this step, it only matters whether a cassette is set to be the same paper size as that of the designated cassette is present, but does not matter whether the paper is set by aligning its long or short side with the paper feed direction.

If it is determined in step S1 that no other cassette is set to be the same paper size as that of the designated cassette, the flow advances to step S6 to designate the paper feed cassette selected by the operation panel 9, i.e., the one corresponding to the data stored in the designated paper feed cassette area. When a corresponding one of the paper sensors 26a, 26b, 26c, designated paper feed cassette, the paper is fed therefrom (step S6). If it is detected that the paper P is not present in the designated cassette, the image forming apparatus turns on the "OPERATOR" lamp of the LED display 9b of the operation panel 9 to display the above situation, and stops the operation.

Subsequently, image data supplied from the host unit 58 and stored in a page buffer of the RAM 52 is printed (step S7). In this printing operation, the image data stored in the page buffer is converted into bit image data and is supplied to the video RAM 54 as a scan buffer. The video RAM 54 supplies the bit image data as parallel data to the serial-parallel converter 55. The converter 55 converts the bit image data as parallel data into serial data, and supplies it to printer circuits 47 and 49. With this operation, an image is formed on the paper P which is fed to an image transfer portion 23 synchronously with the supply of bit image data, thereby completing the series of printout processing.

If YES is obtained in step S1, the flow advances to step S2 to check whether a paper feed cassette which is set to store paper by aligning its short side with the paper feed direction is present. If NO is obtained in step S2, the flow advances to step S6 to feed the paper from the paper feed cassette designated by the operation panel, and printing is performed in the same manner as described above (steps S6 and S7). In this case, therefore, printing is performed with respect to the paper P whose long side is aligned with the paper feed direction.

If YES is obtained in step S2, the flow advances to step S3 to check whether paper is present in the corresponding paper feed cassette.

If NO is obtained in step S3, the flow branches to step S8 to designate a paper feed cassette which is set to store paper by aligning its long side with the paper feed direction. Paper feed and printing are then performed in the same manner as described above (steps S6 and S7). Similarly, in this case, printing is performed with respect to the paper P whose long side is aligned with the paper feed direction.

If YES is obtained in step S3, the flow advances to step S4 to designate the corresponding cassette. The orientation of image data supplied from the host unit 58 and stored in the page buffer of the RAM 52 is changed (step S5). The paper whose short side is aligned with the paper feed direction is fed from the corresponding paper feed cassette (step S6). Printing of the image data whose orientation was changed in step S5 is performed (step S7). Since this printing operation is the same as described above, a further description thereof will be omitted.

As described above, when image data supplied from the host unit 58 is to be printed, and sheets of the paper P of the same size are prepared by the two different setting manners, i.e., one set of sheets are set by aligning their long sides with the paper feed direction and the other set of sheets are set by aligning their short sizes therewith, if the paper P stored in one cassette runs out, the image data is rotated and printed on the paper P stored in the other cassette. Therefore, a large amount of printing can be continuously performed.

In addition, sheets of the paper P of the same size are prepared by the two different setting manners, i.e., one set of sheets are set by aligning their long sides with the paper feed direction and the other set of sheets are set by aligning their short sides therewith, priority in use is given to the paper P whose short side is aligned with the paper feed direction. Therefore, high-speed printing can be performed.

Still another embodiment of the present invention will be described below. According to this embodiment, in the image forming apparatus which is accessed by commands from a plurality of host units, even if corresponding paper is not present in the respective paper feed cassettes storing sheets of paper having different sizes, i.e., the cassettes having the desired size paper are empty, paper can be automatically fed from a paper feed cassette for storing paper of other size, thereby preventing delay in processing and improving operability of the apparatus.

Types of paper P used in the image forming apparatus 1 of the present invention will be described below with reference to FIGS. 9A to 9D. FIG. 9A shows paper of the smallest size used in this apparatus, which has a size of 8.5×5.5 inches and is generally called a statement size (to be referred to as "ST size" hereinafter). Characters of 51 lines can be printed on the paper P of the ST size at a line pitch of 6 LPI (lines per inch). The number of printable character lines is called a form length. The paper P of the ST size is set in a paper feed cassette 25d. FIG. 9B shows paper of the second smallest size (a second image forming medium) used in this apparatus, which has a size of 11×8.5 inches and is generally called a letter size (to be referred to as "LT size" hereinafter). The paper P of the LT size has a form length of 66. The paper P of the LT size is set in a paper feed cassette 25a. FIG. 9C shows paper of the second largest size (a first image forming medium) used in this apparatus, which has a size of 14×8.5 inches and is generally called legal size (to be referred to as "LG size" hereinafter). The paper P of the LG size has a form length of 84. The paper P of the LG size is set in a paper feed cassette 25b. FIG. 9D shows paper of the largest size (a third image forming medium) used in this apparatus, which has a size of 17×11 inches and is generally called a ledger size (to be referred to as an "LD size" hereinafter). The paper P of the LD size has a form length of 102. The paper P of the LD size is set in a paper feed cassette 25c.

Selection of the paper P of each size is performed by causing the CPU 50 to analyze a form length supplied as a command from a host unit 58 prior to supply of image data.

Figure 10:
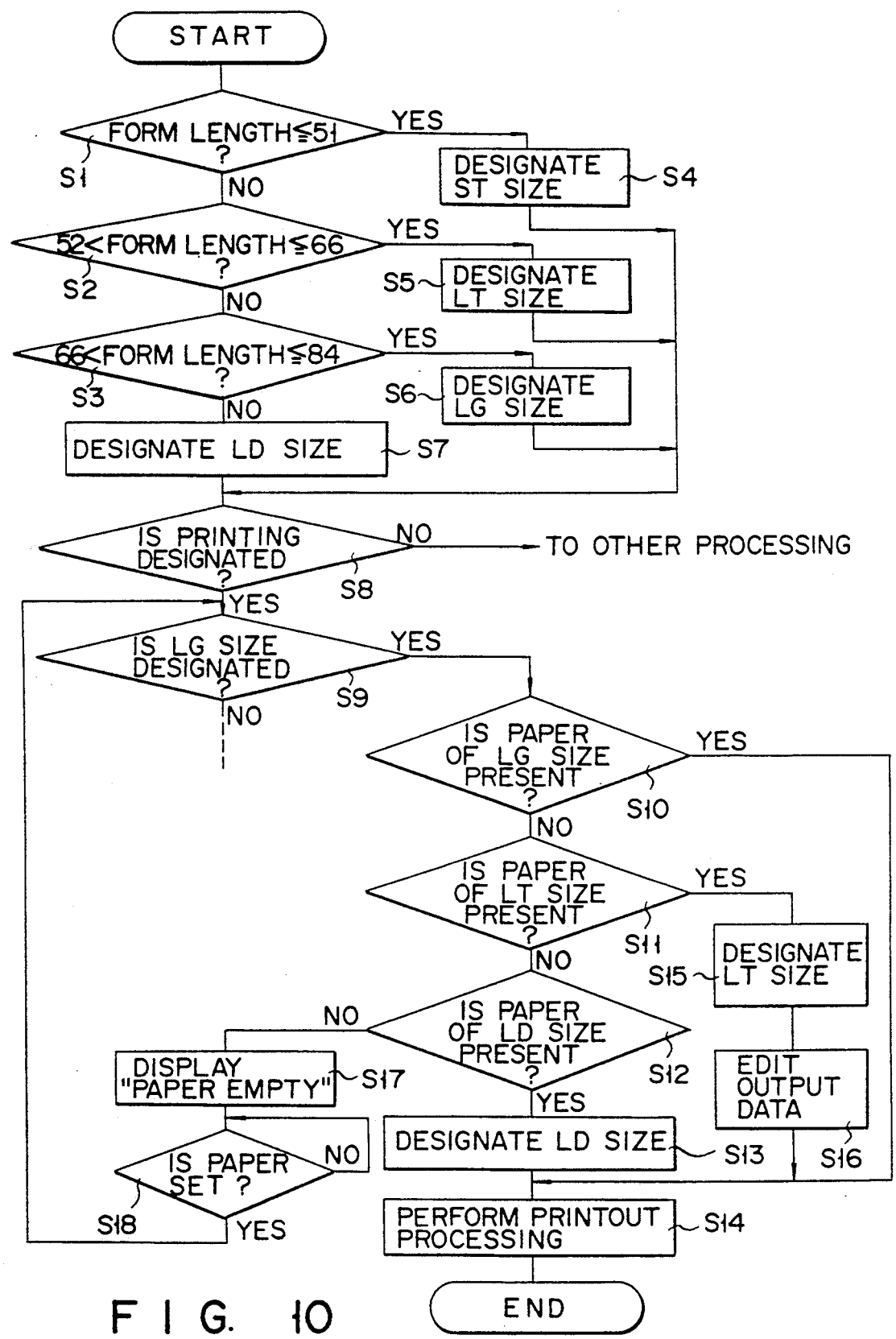
FIG. 10 is a flow chart for explaining still another edit function for image data and a corresponding paper selecting operation in the laser printer of the present invention.

As indicated by a flow chart in FIG. 10, a command is supplied first from the host unit 58 prior to transmission of image data. This command is supplied to the CPU 50 through a host interface 57 and an internal bus 61 shown in FIG. 5. When the CPU 50 recognizes the command as a command for designating a form length, it checks whether the form length is 51 or less (step S1). If YES is obtained in step S1, the flow advances to step S4 to designate to use the paper P of the ST size so as to enable feed of paper from the paper feed cassette 25d, and the flow branches to step S8. If NO is obtained in step S1, it is checked whether the form length is larger than 52 and not more than 66 (step S2). If YES is obtained in step S2, the flow advances to step S5 to designate to use the paper P of the LT size so as to enable feed of paper from the paper feed cassette 25a, and the flow advances to step S8. If NO is obtained in step S2, it is checked whether the form length is larger than 66 and not more than 84 (step S3). If YES is obtained in step S3, the flow advances to step S6 to designate to use the paper P of the LG size so as to enable the feed of paper from the paper feed cassette 26b, and the flow branches to step S8. If NO is obtained in step S3, use of the paper P of the LD size is designated to enable feed of paper from the paper feed cassette 25c, and the flow advances to step S8. With the above operation, selection of the paper P by means of analysis of the command is completed. An operation in a case wherein the paper P of the LG size is designated will be described below.

When size designation of the paper P to be used is completed, the CPU 50 receives image data supplied from each host unit 58 and sequentially stores it in a receiving buffer (not shown) arranged in the RAM 52. When reception of one-page image data is completed, it is checked whether printing is designated (step S8). If NO is obtained in step S8, the flow of other processing is started (a detailed description thereof will be omitted).

If YES is obtained in step S8, it is checked whether paper P of the LG size is designated (step S9). If NO is obtained in step S9, it is checked whether paper P of the ST, LT, or LD size is designated. In each designation of the size, substantially the same operation as that of designation of paper P of the LG size, which will described below, is performed, and hence a description thereof will be omitted.

If YES is obtained in step S9, it is checked whether paper P of the LG size is present in the cassette 25b (step S10). The presence or absence of paper P of the LG size is determined by the CPU 50 upon transmission of the signal from a paper sensor 26b arranged above the cassette 25b shown in FIGS. 3 and 5 to the CPU 50 through printer circuits 47 and 49, a printer interface 60, and the internal bus 61. If YES is obtained in step S10, the flow branches to step S14 to convert the image data stored in the receiving buffer of the RAM 52 into bit image data and supply it to a Video RAM 54 serving as a scan buffer. The video RAM 54 supplies the bit image data as parallel data to a serial-parallel converter 55. The serial-parallel converter 55 converts the bit image data as the parallel data into serial data, and supplies it to the printer circuits 47 and 49. With this operation, an image is formed on paper P of the LG size which is fed to an image transfer portion 23 synchronously with the supply of the bit image data, thus completing the series of print out processing.

If NO is obtained in step S10, it is then checked whether paper P of the LT size is present (step S11). The presence or absence of paper P of the LT size is determined by the CPU 50 upon transmission of a signal from a paper sensor arranged 26a above the cassette 25a to the CPU 50 in the same manner as described above. If YES is obtained in step S11, the flow branches to step S15 to designate the paper P of the LT size in place of the currently designated paper P of the LG size so as to enable feed of paper from the cassette 25a. As shown in FIG. 11, the image data stored in the page buffer in the RAM 52 is then divided in two, and is edited as if two-page image data corresponding to two sheets of the paper P of the LT size are obtained (step S16). The flow then branches to step S14 to form images corresponding to two pages on sheets of the paper P of the LT size, thereby completing the series of printout processing.

If NO is obtained in step S11, it is checked whether paper P of the LD size is present (step S12). The present or absence of paper P of the LD size is determined by the CPU 50 upon transmission of a signal from the paper sensor 26c arranged above the cassette 25c in the same manner as described above. If YES is obtained in step S12, paper P of the LD size is designated in place of the currently designated paper P of the LG size so as to enable feed of paper from the cassette 25c (step S13). The flow then advances to step S14, in which the image data stored in the page buffer in the RAM 52 is directly output, and an image is formed on the paper P of the LD size in the same manner as described above, thus completing the series of printout processing. In this case, as shown in FIG. 12, the image is formed on part of the paper P of the LD size.

If NO is obtained in step S12, the CPU 50 recognizes an inoperative state and outputs a paper empty display (step S17). More specifically, the CPU 50 supplies predetermined data to an operation panel control circuit 56 through the internal bus 61 so as to turn on and off the "OPERATOR" lamp of an LED display 9b of the operation panel, thereby alerting the operator to set the paper P. It is then checked whether the paper P is set in any one of the paper feed cassettes 25a, 25b, and 25c by sequentially checking output signals from the paper sensors 26a, 26b, and 26c. The flow waits for the paper P to be set in any one of the cassettes (step S18).

If the paper P is set in any one of the cassettes in this state, the flow returns to step S9 to perform image formation by executing the above-described series of operations.

As described above, if an image formation request corresponding to, e.g., paper P of the LG size is supplied from a host unit, and paper P of the LG size is not present in the paper feed cassette 25b, it is checked whether paper P of the LT size, which is smaller than paper P of the LG size, is present in the paper feed cassette 25a. If paper P of the LT size is present, image data supplied in accordance with the LG size is divided in two to be formed on two sheets of paper P of the LT size. If the paper P of the LT size is not present either, it is checked whether paper P of the LD size, which is larger than the paper P of LG size, is present in the paper feed cassette 25c. If paper P of the LD size is present, the image data supplied in accordance with the LG size is directly formed on part of the paper P of the LD size. It is only after paper P of the LD size is determined to be absent that replenishment of paper is requested. With this operation, even if an operator is not present around the image forming apparatus, as long as the paper P is left in any paper feed cassette, paper feed can be automatically performed from the corresponding cassette. For this reason, the apparatus is not stopped because of the receiving buffer filled with data. The apparatus can respond to an image formation request with respect to paper P of another size from another host unit, and received image data is not lost. In addition, there is no need for a request to stop data transmission to each host unit. Therefore, processing of each host unit is free from delay.

In the above embodiment, a case wherein an image formation request corresponding to the LG size is received, and the paper P of the LG size is not present is described. However, the present invention is not limited to this. For example, if an image formation request corresponding to the ST size is received, and the paper P of the ST size is not present, paper P of the LT, LG, or LD size, larger than the paper of the ST size, may be used as a substitute. If an image formation request corresponding to the LT size is received, and the paper P of the LT size is not present, the image data may be divided in two, and the divided data are respectively rotated through 90° to be formed on two sheets of the paper P of the ST size, which is smaller than the paper P of the LT size. Otherwise, paper P of the LG or LD size, which is larger than paper P of the LT size, may be used as a substitute. If an image formation request corresponding to the LD size, and paper P of the LD size is not present, the image data may be divided in two, and the divided data may be respectively rotated through 90° to be formed on two sheets of paper P of the LT or LG size, which is smaller than paper P of the LD. In these cases, the same effects as described above can be obtained.

Figure 13:
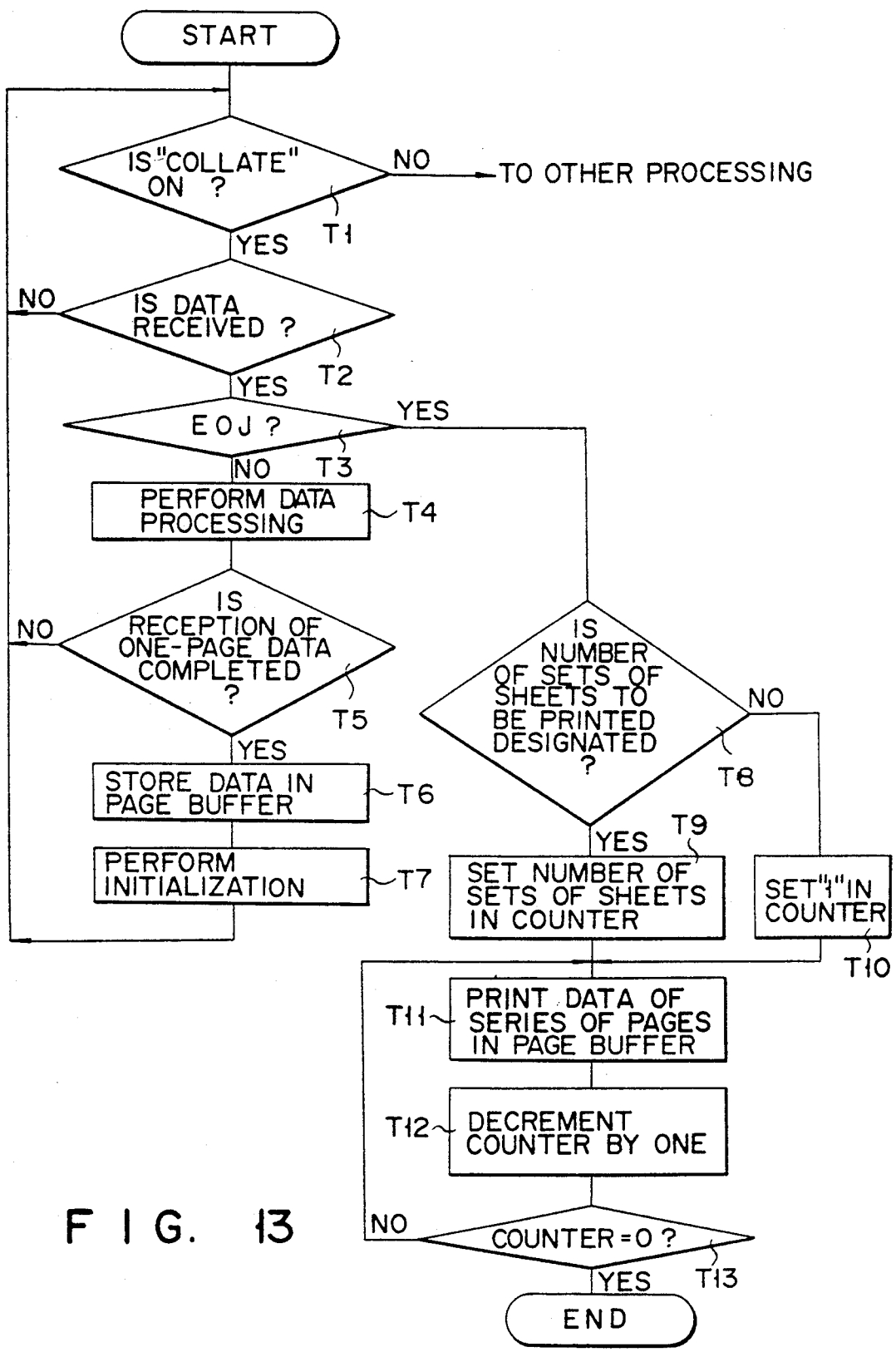
FIG. 13 is a flow chart for explaining a collate printing operation in the laser printer of the present invention.

Still another embodiment of the present invention will be described below with reference to the flow chart shown in FIG. 13 and FIG. 14. According to this embodiment, when a plurality of sets of sheets are to be printed in units of pages, sorted, printed sheets can be obtained upon completion of printing of all the pages.

An operator designates first collate printing through an operation panel 9. This designation is performed as follows. A "NEXT ITEM" or "PREVIOUS ITEM" key for the menu data of the operation panel 9 is cyclically operated to change the display contents of the message display area formed on the left portion of an LCD display 9a to display a message "COLLATE:" for designating the collate printing. In this state, the "NEXT ITEM" or "PREVIOUS ITEM" key for the value data is operated to display "YES" or "NO" on the input area formed on the right portion of the LCD display 9a, and the input key is depressed when the desired value data is displayed. With this operation, any one of the value data is supplied to a CPU 50 through an operation panel control circuit 56. The data is then decoded by the CPU 50 and stored in a RAM 52 as a collate flag.

When printing is started in this state, the collate flag is checked first to determine whether collate printing should be performed (step T1). If NO is obtained in step T1, the flow moved to other processing.

If YES is obtained in step T1, the flow advances to step T2 to check whether data is received. If NO is obtained in step T2, the flow returns to step T1 to wait for reception of data while executing steps T1 and T2. When data is received in this state, it is checked whether the received data is an EOJ (end of job) code representing a delimiter of image data (step T3). If NO is obtained in step T3, the flow advances to step T4 to perform editing of the received data so as to obtain proper one-page image data and to store sequentially the obtained data in a receiving buffer arranged in the RAM 52. If it is determined that one-page data is received (step T5), the contents of the receiving buffer is stored in a page buffer arranged in the RAM 52 (step T6). Subsequently, various flags and the like used in the series of processing are initialized (step T7), and the flow returns to step T1 to repeat the same operation as described above with respect to the next image data. In this manner, image data which is edited in units of pages is sequentially stored in the page buffer in the order of received image data. If YES is obtained in step T3 during the reception of the image data, a copy flag (to be described later) is checked to determine whether the number of sets of sheets to be printed is designated (step T8). Designation of the number of sets of sheets to be printed is performed by an operator through the operation panel 9 prior to a printing operation. For example, this designation is performed as follows. The "NEXT ITEM" or "PREVIOUS ITEM" key for the menu data of the operation panel 9 is operated cyclically to change the display contents of the message display formed on the left portion of the LDC display 9a so as to display a message "COPIES:" for designating the number of sets of sheets. In this state, the "NEXT ITEM" or "PREVIOUS ITEM" key for the value data is operated to display "1" to "99" on the input area formed on the right portion of the LCD display 9a, and the input key is depressed when a desired number is displayed. With this operation, the above number is supplied as value data to the CPU 50 through the operation panel control circuit 56. The value data is then decoded by the CPU 50 and is stored in a storage area for the number of sets of sheets to be printed in the RAM 52. At the same time, a copy flag is set representing that printing of a plurality of sheets of paper is designated.

If it is determined by checking the copy flag in step T8 that the number of sets of sheets to be printed is not designated, a predetermined value "1" is set as the number of sets of sheets in a counter arranged in the RAM 52 (step T10). If it is determined that the number of sets of sheets is designated, the number stored in the area for the number of sets of sheets to be printed is set in the counter (step T9).

Subsequently, the sets of image data formed in the page buffer in the order of pages are printed (step T11). Since printing is performed in the same manner as described above, a description thereof will be omitted. The counter is then decremented (step T12), and it is checked whether the value of the counter becomes zero (step T13). The above printing operation (from step T11 to step T13) is repeated until the contents of the counter become zero. When the contents of the counter become zero, the series of processing described above is completed. With this operation, as shown in FIG. 14, a plurality of sets of sheets which are sorted and printed in the order of pages can be obtained.

As has been described above, when a plurality of sets of sheets are to be printed, image data supplied from the host unit 58 is edited to obtain one-page image data and is sequentially stored in the page buffer. When the reception end of the image data is determined by receiving an EOJ code, the set of image data which are stored in the page buffer in the order of pages are continuously printed, and this series of printing is performed by the number of times designated at the operation panel 9. With this operation, a desired number of sets of sorted, printed sheets of paper can be obtained, and hence the operator need not manually sort the printed sheets upon completion of printing, thus reducing labor time.

It should become obvious to those skilled in the art that this invention is not limited to the preferred embodiments shown and described.

What is claimed is:

1. An image forming apparatus comprising:
   means for receiving original image data supplied from a host unit;
   means for inputting to the apparatus the size and orientation of the original image data;
   means for storing sheets of copy paper including a first copy paper having the size and orientation of the original image data, a second copy paper having the size of the original image data and an orientation of 90-degree rotated with respect to the original image data and a third copy paper having a size other than the size of the original image data;
   means for detecting the size and orientation of the copy paper stored in said storing means; and
   means for editing original image data supplied from the host unit, the original image being formed on a first copy paper having the size and orientation of the original image data when it is detected that the first copy paper is stored in the storing means, so that the original image data is rotated by 90 degrees and is formed on the second copy paper when it is detected that no first copy paper is stored an the second copy paper is stored in the storing means, and the original image data is formed on the third copy paper after it is edited in accordance with the size and the orientation of the third copy paper when no first and second sheets of copy paper are stored and the third copy paper is stored in the storing means.

2. A method of forming an image comprising the steps of:
   receiving original image data supplied from a host unit;
   inputting to an image forming apparatus information regarding the size and orientation of the original image data;
   storing sheets of copy paper including first copy paper having the size and the orientation of the original image data, second copy paper having the size of the original image data and an orientation of 90-degree rotated with respect to the original image data and third copy paper having a size other than the size of the original image data;
   detecting the size and the orientation of the copy paper stored in said storing means; and
   editing the original image data supplied from the host unit, so that the original image is formed on a first copy paper having the size and the orientation of the original image data when it is detected that the first copy paper is stored int he storing means, the original image data being rotated by 90 degrees and is formed on the second copy paper when it is detected that no first copy paper is stored and the second copy paper is stored in the storing means, and the original image data is formed on the third copy paper after it is edited in accordance with the size and the orientation of the third copy paper when no first and second sheets of copy paper are stored and the third copy paper is stored in the storing means.

3. An apparatus according to claim 1, wherein said image data editing means comprises:
   means for designating orientation of the image data with respect to a feed direction of the image forming medium;
   means for detecting a set direction of the image forming medium with respect to the feed direction; and
   means for controlling the formation of an image in accordance with the designated orientation when a set direction of an image forming medium based on orientation of the image data coincides with the set direction of the image forming medium with respect to the feed direction, said set direction being detected by said detecting means, and changing the orientation of the received image data so that an image is formed on the detected image forming medium when the set directions do not coincide.

4. An apparatus according to claim 1, wherein said image data editing means comprises:
   detecting means for selecting one of a plurality of image forming medium storage means and for detecting the presence of a desired image forming medium in said selected storage means;
   first determining means for determining a size of the image forming medium when said detecting means detects presence of a desired image forming medium, and deter mining presence of a desired image forming medium of the same size in another storage means when said detecting means detects an absence of the desired image forming medium;

second determining means for determining a set direction of the desired image forming medium in said selected storage means when said detecting means detects presence of the desired image forming medium, and when said first deter mining means determines presence of an image forming medium of the same size in another storage means, deter mining a set direction of the image forming medium of the same size with respect to the feed direction; and means for controlling the change of orientation of the received image data and for forming an image on the image forming medium stored in said another storage means when the set direction of the image forming medium stored in said another storage means, which is determined by said second determining means, with respect to the feed direction does not coincide with a set direction of the desired image forming medium based on orientation of the image data.

5. An apparatus according to claim 4, wherein said control means changes the orientation of the received image data when said second determining means determines that the set direction of the image forming medium in said selected storage means with respect to the feed direction is set by aligning a long side of the image forming medium with the feed direction, and said first determining means determines that an image forming medium of the same size is stored in another storage means, and determines that the set direction of the image forming medium of the same size with respect to the feed direction is set by aligning a short side of the image forming medium with the feed direction.

6. An apparatus according to claim 1, wherein said image data editing means comprises:
   means for determining data representing a size of the image data, which data is supplied prior to the image data;
   first detecting means for detecting the presence of a first image forming medium corresponding to the size of the image data determined by said determining means;
   second detecting means for detecting presence of a second image forming medium having a size at least not less than ½ that of the first image forming medium when said first detecting means detects absence of the first image forming medium;
   detecting means for detecting presence of a third image forming medium having a size not less than that of the first image forming medium when said second detecting means detects absence of the second image forming medium;
   means for dividing the received image data when said second detecting means detects presence of the second image forming medium; and
   image forming means for forming an image, which is based on the image data divided by said image data dividing means, on the second image forming medium in accordance with the number of divided data when said first means detects absence of the first image forming medium and said second detecting means detects presence of the second image forming medium, and for forming the image on the third image forming medium when said second detecting means detects absence of the second image forming medium.

7. An apparatus according to claim 1, wherein said image editing means further includes:
   means for determining a transmission end of image data;
   second means for editing the received image data in units of pages;
   means for sequentially storing the image data which is edited in units of pages until the transmission end is detected by said determining means;
   means for designating, prior to image formation, the number of sets of sheets, on which images are formed, in units of pages; and
   means for forming images on an image forming medium according to the number of sets of sheets designated b said designating means on the basis of collective image data when said determining means determines the transmission end of the image data, the collective image data corresponding to continuous pages which are stored in said storage means until the transmission end of image data is detected by said determining means.

* * * * *